(No Model.)

A. A. BYNON.
DEVICE FOR ILLUSTRATING FRACTIONS.

No. 267,402. Patented Nov. 14, 1882.

Witnesses,
Geo. H. Strong.
S. H. Nourse

Inventor
A. A. Bynon
By Dewey & Co.
Attorneys

UNITED STATES PATENT OFFICE.

ALFRED A. BYNON, OF ALAMEDA, ASSIGNOR OF ONE-HALF TO JAMES T. WHITE, OF SAN FRANCISCO, CALIFORNIA.

DEVICE FOR ILLUSTRATING FRACTIONS.

SPECIFICATION forming part of Letters Patent No. 267,402, dated November 14, 1882.

Application filed April 18, 1882. (No model.)

*To all whom it may concern:*

Be it known that I, ALFRED A. BYNON, of Alameda, county of Alameda, State of California, have invented an Improved Arithmetical Instructor; and I hereby declare the following to be a full, clear, and exact description thereof.

My invention relates to a new and useful arithmetical instructor; and it consists in the employment of a suitable body having a spherical shape or a somewhat kindred shape, made of wood or otherwise artificially constructed to represent any desired object, said body being suitably adapted to be supported in such manner that when properly divided into fractional parts each part, or any number, or the whole thereof, may be conveniently upheld, or may be removed separately or together for exhibition without disturbing the remainder.

The object of my invention is to teach the character and value of fractions by exhibiting the various fractional portions into which the body is divided, and to render such instruction effective and easy by reason of the spherical shape of the body and the convenient means for supporting it, and allowing the separation of any part while the rest remains intact, whereby it may readily be seen what portion the part removed bears to the whole.

Figure 1:
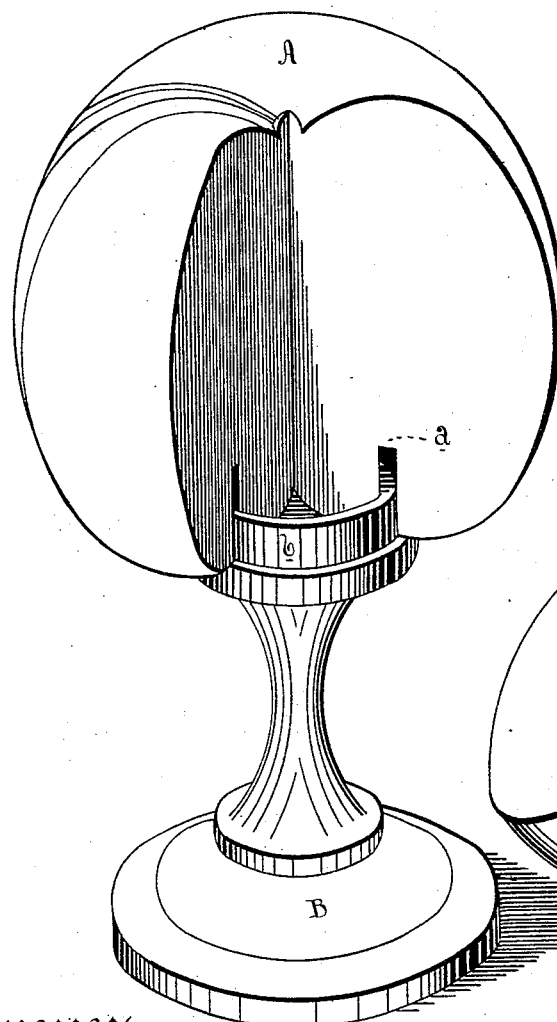
Figure 2:
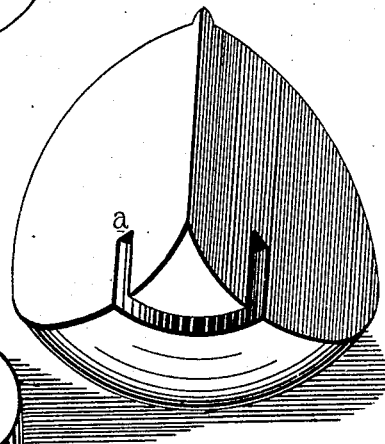

Referring to the accompanying drawings, Figure 1 is a view of my invention with section removed. Fig. 2 is a view of the section.

Let A represent a body, being either spherical in shape or approximating such shape, artificially made of wood for the sake of lightness, economy, and general fitness for the purpose. This body may be made to represent any object desired—as, for example, a sphere, pear, apple, turnip, potato, or any other object which may be conveniently divided into fractional parts. A desirable point is to make the semblance of some object with which children are familiar, and which for that and other reasons will be likely to interest them and claim their attention. I have here shown the body as resembling an apple, and this shape I prefer to use, as being the most desirable for all reasons. While the apple is still entire upon its base or stem end I cut out a deep groove or channel, *a*, made in the form of a circle around the center or stem.

Let B represent a stand of any suitable shape and height. Upon its top is a high flange, *b*, made in a circle of a diameter equal to that of the groove *a*. The apple is set on the stand, the flange of the latter fitting the groove of the former and holding it upright. The apple may be divided into any fractional portions. Each portion is upheld by the flange and may be removed to show to the pupils without disturbing any of the other portions, which will remain sustained upon the stand. I may have any number of these apples or a set of them, one being divided into halves, quarters, eighths, &c., another in thirds, sixths, ninths, &c., and a third in fifths, tenths, fifteenths, &c.

The wooden apples are neat and clean, and much superior to the employment of a real apple. Their convenience and cheapness recommend them, and the manner of their use is evident.

The advantage of having the body artificially made is that it is susceptible of more accurate and convenient divisions, and the reason of having it of the shape or shapes described is that thereby it may be more completely demonstrated that a portion of it is but a fraction and nothing else, as it cannot be the whole of anything, which fact cannot be demonstrated as well by cubes or lines, as half a cube may be a whole cube in itself and half a line is a line as perfect as the whole.

Having thus described my invention, what I claim as new, and desire to secure by Letters Patent, is—

1. An arithmetical instructor consisting of the combination of a suitable body, divided into fractional portions, with a stand to support said body, either as a whole or any portion thereof, in such manner as to allow the removal of any portion without disturbing the remainder, substantially as herein described.

2. An arithmetical instructor consisting of a suitable body constructed, as shown, to be conveniently supported upon a stand and divided into fractional parts or portions, each being adapted to be removed independently of the others, substantially as herein described.

3. An arithmetical instructor consisting of the body A, having a groove, *a*, cut in one end, and the stand B, having upon its top a flange, *b*, fitting into the groove *a* of the body A and supporting said body, substantially as herein described.

In witness whereof I hereto set my hand.

ALFRED A. BYNON.

Witnesses:
G. W. EMERSON,
S. H. NOURSE.